INVENTOR
EUGÈNE, CAMILLE SAINT-JACQUES

ATTORNEYS

United States Patent Office 3,397,762
Patented Aug. 20, 1968

3,397,762
DEVICE FOR THE AUTOMATIC DISTRIBUTION OF A STREAM OF POWDERED OR GRANULAR MATERIAL AND ITS APPLICATION TO A HIGH-OUTPUT LOADING PLANT IN WHICH SAMPLING IS EFFECTED EITHER CONTINUOUSLY OR AT REGULAR INTERVALS
Eugene Camille Saint-Jacques, 11 Rue Marbeau, Paris 16eme, France
Filed Nov. 23, 1966, Ser. No. 596,499
Claims priority, application France, Nov. 10, 1966, 83,308
3 Claims. (Cl. 193—21)

ABSTRACT OF THE DISCLOSURE

A hopper having a single top inlet and a transfer section which is divided at the botom by a partition wall to define two outlets. A shutter is mounted within the transfer section to effect the automatic distribution of a stream of powdered or granular material first through one outlet and then the other outlet.

In many handling processes in which powdered or granular materials are transported by a belt conveyor, for example, it proves necessary to divide such materials into two quantities which may be either equal or different but which must be in accurate and constant proportions.

One object of the present invention is to provide a simple and rugged device which is both reliable and efficient and which makes it possible to carry out the above-mentioned distribution operation both automatically and with high precision.

Another object of the invention is to provide a device of this type whereby the proportions of material distributed may be regulated at will.

The device in accordance with the invention essentially comprises a shell for the transfer of the stream of material to be distributed in which is formed a single top inlet and the transfer section of which is divided in two at the bottom portion thereof by means of a partition wall which defines two separate bottom outlets, a shutter which is adapted to move within said transfer shell and which is adapted to close off completely either one or the other of said outlets, and means for imparting to said movable shutter a reciprocating movement such as to cause said shutter to close off one outlet and to free the other outlet in successive and alternate sequence.

By virtue of this arrangement, the powdered or granular material which is admitted through the single inlet is diverted towards one outlet then the other in alternate sequence and is consequently delivered through said outlets at respective flow rates which are proportional to the respective times of closure of said outlets.

In order to regulate the proportions in which the stream of material is distributed, the invention provides means for regulating the respective times of closure of each outlet.

This invention also has for its object the application of the above device to a high-output loading plant in which sampling is effected either in continuous operation or at regular intervals.

A plant of this type can, for example, be employed for the purpose of loading ores into boats or for supplying factories and so forth.

The plant in accordance with the invention comprises a first unit for the automatic distribution of a stream of powdered or granular material, one bottom outlet of which is joined to a first feed chute and the other bottom outlet of which opens into the receiving hopper of a second automatic distribution unit, one bottom outlet of which is joined to a second feed chute and the other bottom outlet of which is joined to a sampling chute.

As a preferred feature, a flow-regulating device such as a rotary volumetric shut-off valve is interposed between the receiving hopper of the second automatic distribution unit and the top inlet of said second unit.

Figure 1:
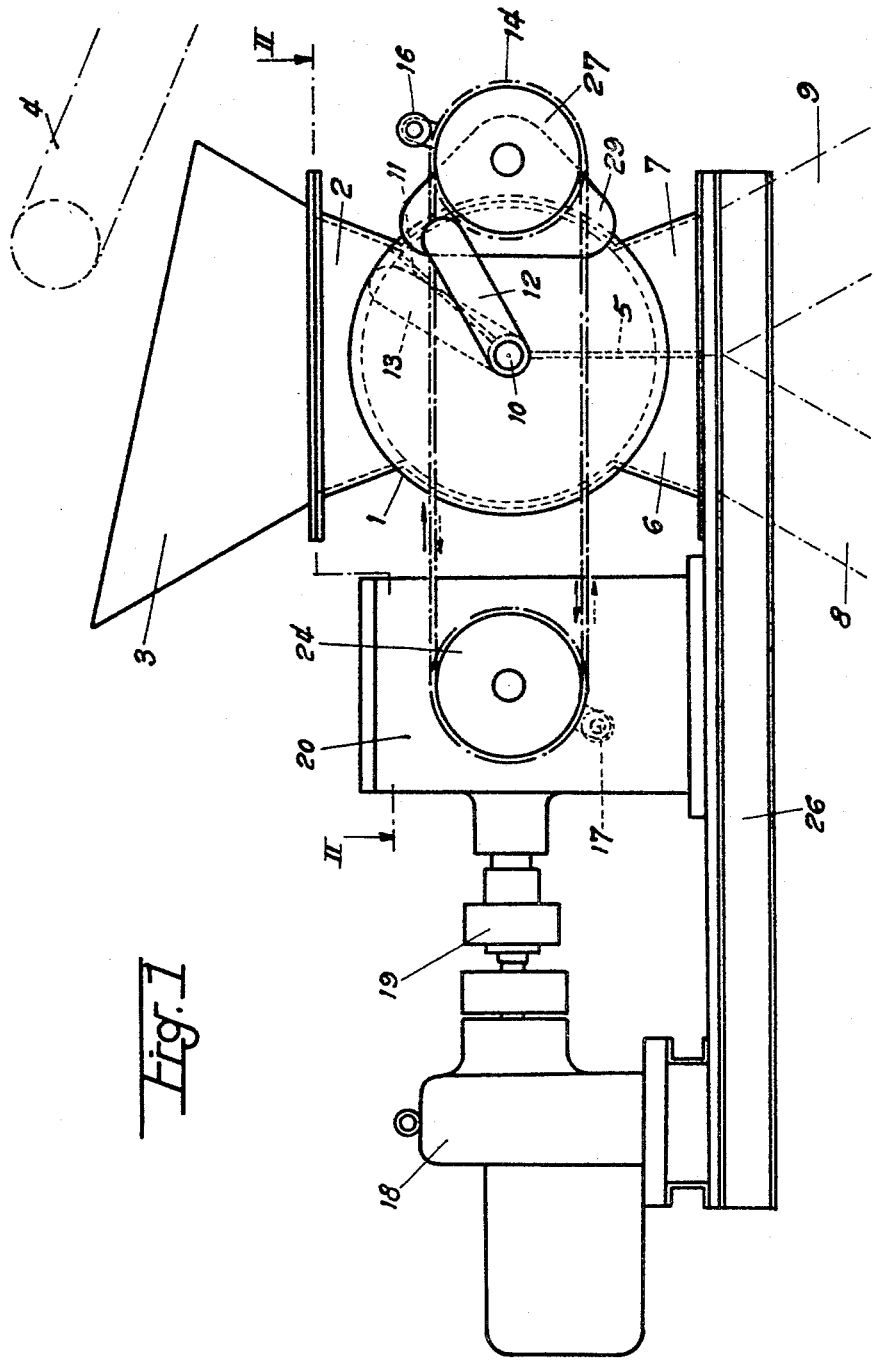
Figure 2:
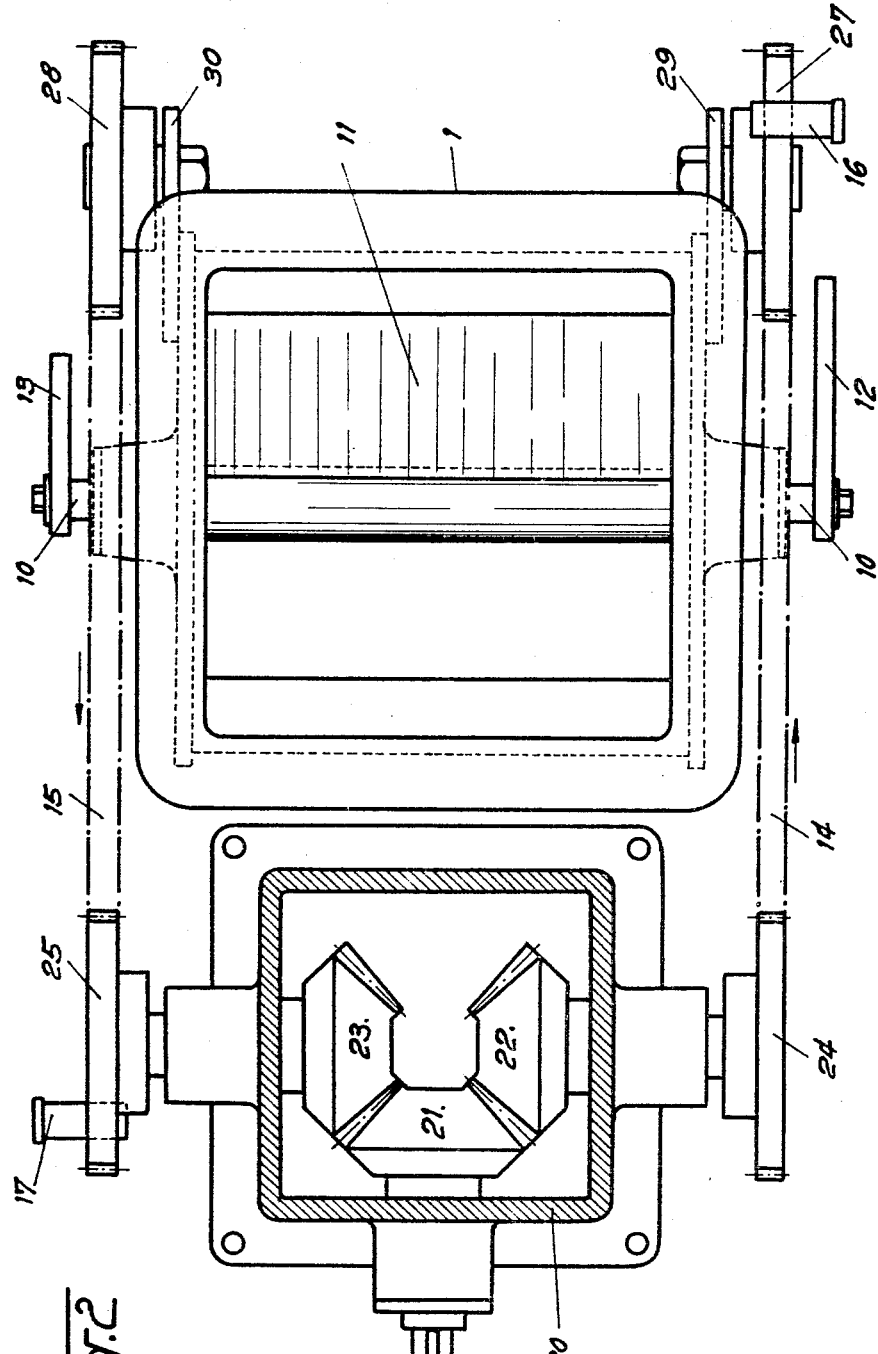
Figure 3:
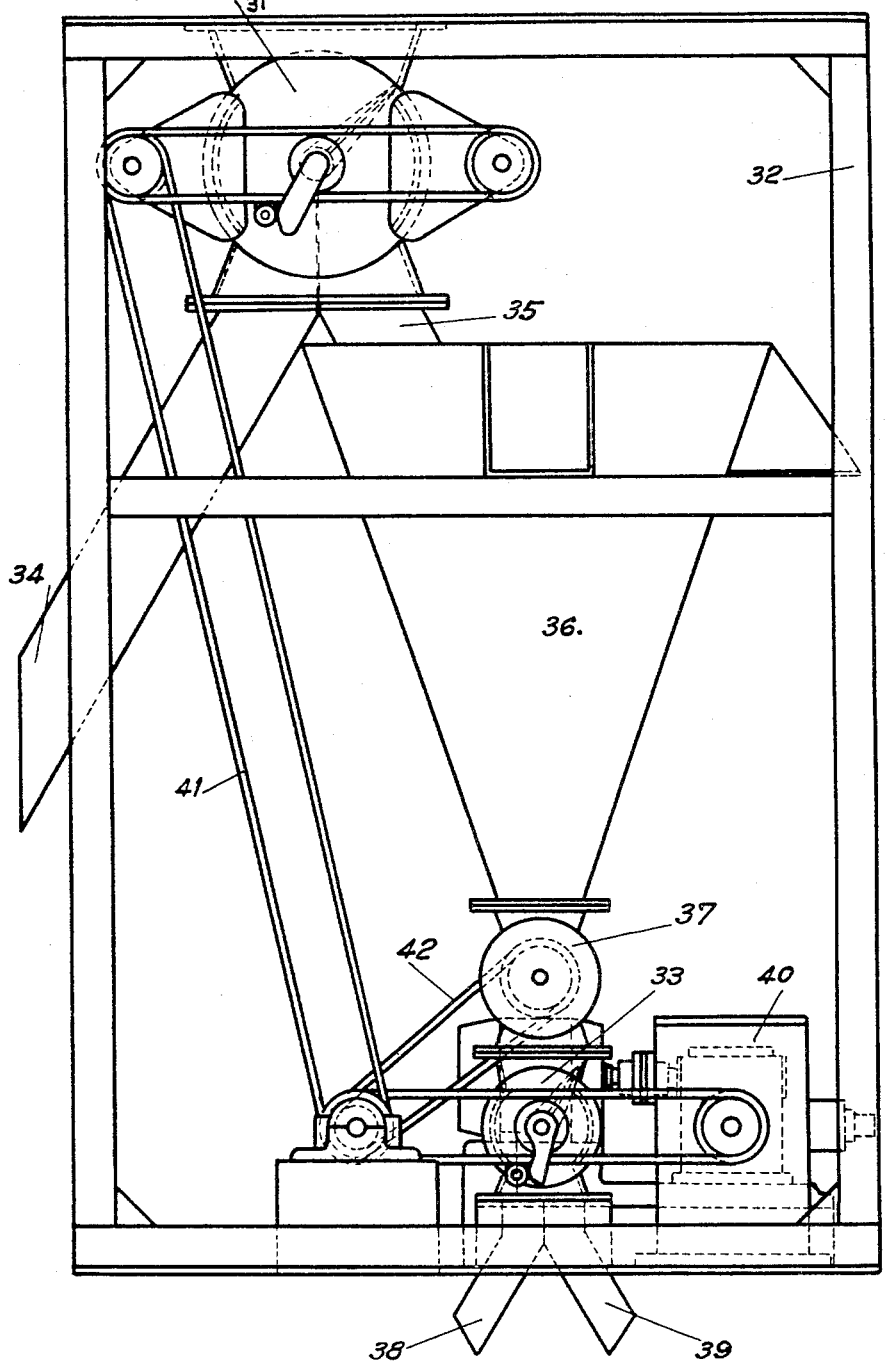

One form of execution of the invention is illustrated by way of example in the accompanying drawings, in which:
FIG. 1 is a simplified view in elevation of the device;
FIG. 2 is a view in cross-section on a larger scale taken along line II—II of FIG. 1, and
FIG. 3 is a simplified view in elevation of a plant in which a device of this type is utilized.

The device which is shown in FIGS. 1 and 2 comprises a transfer shell 1, the top inlet 2 of which is surmounted by a receiving hopper 3 into which is fed a stream of powdered or granular material which is transported by a belt conveyor 4.

In the lower portion of said shell 1, the transfer section is divided in two by a central vertical partition wall 5 and this latter defines two separate bottom outlets 6 and 7 which open respectively into two separate ducts 8 and 9.

There is mounted along the top end of said partition wall 5 a horizontal shaft 10 which is pivotally mounted in two opposite side walls of the shell 1 and on which is keyed inside said shell 1 a shutter 11 which is capable of closing off completely either one or the other of said outlets 6 or 7. The two ends of the shaft 10 extend beyond the shell 1 on each side of this latter and a crank-arm 12 or 13 is keyed on each shaft-end. These two crank-arms are displaced angularly with respect to each other as can readily be seen from FIG. 1.

Two endless chains 14 and 15 which carry respectively a dog 16 and 17 are disposed on each side of the shell 1 and in relation with the crank-arms 12 and 13, as will be explained hereinafter. The two endless chains 14 and 15 are identical and parallel but rotate in opposite directions. Said chains are driven from a same reduction-gear motor set 18 by means of a coupling unit 19 and a gear box or transmission casing 20 comprising three bevel pinions, namely a driving pinion 21 and two intermediate bevel pinions 22 and 23 which are rigidly coupled respectively to two drive sprockets 24 and 25 over which are passed the chains 14 and 15 respectively. The reduction-gear motor set 18, the transmission casing 20 and the transfer shell 1 are mounted on a common frame 26. The driven sprockets 27 and 28 of the endless chains 14 and 15 are each mounted to rotate freely on a support bracket 29 and 30 respectively, said brackets being rigidly fixed to the shell 1.

The operation of the device is as follows:
The conveyor 4 delivers into the hopper 3 a stream of powdered or granular material which passes into the transfer shell 1 through the top inlet 2 of this latter. The endless chains 14 and 15 are driven by the reduction-gear motor set 18 in opposite directions as indicated by the arrows in the drawing. As has been stated, the complete assembly which is constituted by the shutter 11, shaft 10 and crank-arms 12 and 13 is capable of pivoting between two end positions each corresponding to the complete closure of one of the outlets 6 and 7 while the other outlet remains open. In the drawings, the outlet 7 is shown in the closed position. Consequently, at this moment, the entire stream of material which passes through the shell 1 flows solely through the duct 8 via the outlet 6.

During its travel, the dog 17 which is carried by the endless chain 15 will strike the end of the crank-arm 13 and thus initiate the pivotal motion of said crank-arm and consequently of the shutter 11 towards the other end position (which is not shown in the drawings). In this other end position, the end of the crank-arm 13 is released from the dog 17 which continues its travel. The outlet 6 is in turn closed and the stream of material which passes through the shell 1 now flows solely through the duct 9 via the outlet 7.

However, the crank-arm 12 has swung round at the same time as the crank arm 13 and the shutter 11 and the end of said crank-arm which was previously located beneath the path of the dog 16 has moved into position above said path. As it passes, the dog 16 will in turn come into contact with the crank-arm 12 and will consequently perform the same work as was previously performed by the crank-arm 13 but in the opposite direction; in other words, the device will be restored to the initial position which is illustrated in the drawings.

Thus, the shutter 11 will close off the outlets 6 and 7 in alternate sequence and the stream of material which passes through the shell 1 will be diverted alternately towards the ducts 8 and 9 between which it will be divided in a proportion which depends on the respective times of closure of said outlets.

It will be understood that the proportion referred-to above can be readily modified by changing the respective positions of the dog 16 and 17 on the chains 14 and 15.

The loading plant which is illustrated in FIG. 3 comprises a first automatic distribution unit 31 which is placed at the top of a frame 32 and a second automatic distribution unit 33 which is placed at the bottom of said frame.

One bottom outlet of the unit 31 is joined directly to a first feed chute 34 and the other bottom outlet is joined to a chute 35 which opens into a receiving hopper 36. Said hopper is located above the top inlet of the unit 33. A flow regulator constituted by a rotary volumetric shut-off valve 37 is interposed between the bottom outlet of the hopper 36 and the top inlet of the unit 33.

One bottom outlet of the unit 33 is joined to a second feed chute 38 and the other bottom outlet is joined to a sampling chute 39.

The two automatic distribution devices 31 and 33 as well as the rotary volumetric shut-off valve 37 are driven from a same reduction-gear motor set 40, the unit 33 being coupled to the unit 31 by means of a drive belt 41 and the coupling between the unit 33 and the rotary volumetric shut-off valve 37 being provided by a drive belt 42.

The operation of the installation can readily be understood from the foregoing.

The products to be loaded are fed continuously into the automatic distribution unit 31 which is so adjusted that the greater quantity of products (for example 99% of the total) is delivered directly through the first feed chute 34. The remainder (namely 1%) is delivered through the chute 35 into the receiving hopper 36 in which it constitutes a reserve which can serve for one or a number of subsequent loadings. This reserve will be released by the rotary volumetric shut-off valve 37, the rate of delivery of which is a function of the speed of rotation in the automatic distribution unit 33 which, in the same manner as the unit 31, is so adjusted that the greater proportion of the products (for example nine tenths of the total) will be delivered through the second feed chute 38 whilst the remainder (namely one tenth of the total which is delivered by the hopper 36 and therefore one thousandth of the general aggregate delivered into the unit 31) will pass through the sampling chute 39.

By means of this plant, samples of products delivered by the feed chutes 34 and 38 can therefore be taken at regular intervals, progressively as the loading operations take place.

It is apparent that the second automatic distribution unit could be followed if necessary by a third unit and so on in sequence with a view to obtaining increasingly smaller samples.

It will be readily understood that the invention is not limited to the form of execution herein described and illustrated by way of example and that a large number of detail alternative forms can be contemplated without thereby departing either from the scope or the spirit of the invention.

What I claim is:

1. A device for the automatic distribution of a stream of powdered or granular material, wherein said device essentially comprises a shell for the transfer of the stream of material to be distributed in which is formed a single top inlet and the transfer section of which is divided in two at the bottom portion thereof by means of a partition wall which defines two separate bottom outlets, a shutter constituted by a flap which is keyed on a horizontal pivotal shaft located at the top of the partition wall which serves to divide the transfer section in two, said shutter being adapted to move within said transfer shell, and means for imparting to said shutter a reciprocating movement to close off completely either one or the other of said outlets in alternate sequence, said means including a a crank arm keyed at each end of said pivotal shaft externally of the transfer shell and on each side of said shell, the two crank arms thus provided being in angularly displaced relation and capable of pivoting conjointly with said pivotal shaft and with said shutter between two end positions, each corresponding to the closure of one outlet and the opening of the other outlet and conversely, the pivotal motion of said crank arms and consequently of said shutter being controlled in one direction by a dog which is carried by an endless chain rotating in the same direction and which strikes one of the crank arms in one of the end positions aforesaid but escapes from said crank arm in the other end position and, in the opposite direction, by another dog which is carried by another endless chain rotating in the direction opposite to the preceding chain and which produces action on the other crank arm in an identical manner but in the opposite direction.

2. A device in accordance with claim 1, wherein said dogs are positionally adjustable on said chains.

3. A device in accordance with claim 1, wherein both endless chains are driven from a same motor by means of a double bevel-gear drive system.

References Cited

UNITED STATES PATENTS

| | | | |
|---|---|---|---|
| 747,897 | 12/1903 | Spangler | 193—23 |
| 878,721 | 2/1908 | Gilman | 193—31 |
| 1,418,738 | 6/1922 | Robb | 193—31 |
| 3,109,306 | 11/1963 | Funk | 73—424 |
| 3,253,864 | 5/1966 | Sayre | 302—29 |

ANDRES H. NIELSEN, *Primary Examiner.*